United States Patent
Davis et al.

(10) Patent No.: US 12,457,251 B2
(45) Date of Patent: *Oct. 28, 2025

(54) VOICE CALL CONTROLLER

(71) Applicant: COMCAST CABLE COMMUNICATIONS, LLC, Philadelphia, PA (US)

(72) Inventors: Tamika Davis, Aurora, CO (US); David Waiting, Fairfax, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/910,806

(22) Filed: Jun. 24, 2020

(65) Prior Publication Data

US 2021/0084080 A1 Mar. 18, 2021

Related U.S. Application Data (63) Continuation of application No. 15/883,533, filed on Jan. 30, 2018, now Pat. No. 10,735,474.

(51) Int. Cl.
| | | |
|---|---|---|
| *H04M 1/56* | (2006.01) |
| *H04L 41/0213* | (2022.01) |
| *H04L 65/1046* | (2022.01) |
| *H04L 65/1076* | (2022.01) |
| *H04L 67/1008* | (2022.01) |
| *H04L 67/1029* | (2022.01) |
| *H04L 67/1034* | (2022.01) |
| *H04M 3/42* | (2006.01) |
| *H04M 15/06* | (2006.01) |

(52) U.S. Cl.
CPC ...... *H04L 65/1046* (2013.01); *H04L 41/0213* (2013.01); *H04L 65/1079* (2013.01); *H04L 67/1008* (2013.01); *H04L 67/1029* (2013.01); *H04L 67/1034* (2013.01); *H04M 3/42059* (2013.01)

(58) Field of Classification Search
None
See application file for complete search history.

(56) References Cited

U.S. PATENT DOCUMENTS

| | | | |
|---|---|---|---|
| 6,975,708 B1* | 12/2005 | Scherer | H04M 3/436 379/127.01 |
| 8,005,074 B2 | 8/2011 | Tartarelli et al. | |
| 8,064,342 B2 | 11/2011 | Badger | |
| 8,582,567 B2 | 11/2013 | Kurapati et al. | |
| 10,462,292 B1* | 10/2019 | Stephens | H04M 3/42059 |
| 10,735,474 B2* | 8/2020 | Davis | H04M 7/0075 |
| 2004/0172265 A1* | 9/2004 | Spragle | G06Q 10/06311 705/26.1 |
| 2006/0146792 A1 | 7/2006 | Ramachandran et al. | |
| 2007/0073898 A1* | 3/2007 | Shen | H04L 61/2564 709/245 |

(Continued)

*Primary Examiner* — Quoc D Tran
(74) *Attorney, Agent, or Firm* — BakerHostetler (57) ABSTRACT

A voice call controller (VCC) polls session border controllers (SBCs) to determine routing of Voice over Internet Protocol (VoIP) calls and filter calls based on call source and originator parameters. The VCC re-routes calls in the event of errors, generates filters based on observed behaviors, and communicates filter rules or statistics to other entities.

24 Claims, 4 Drawing Sheets

(56) References Cited

U.S. PATENT DOCUMENTS

| | | | |
|---|---|---|---|
| 2008/0084975 A1* | 4/2008 | Schwartz | H04M 3/436 379/88.22 |
| 2008/0291901 A1* | 11/2008 | Stratton | H04L 65/104 370/352 |
| 2008/0304471 A1 | 12/2008 | Jackson et al. | |
| 2009/0202057 A1 | 8/2009 | Tartarelli et al. | |
| 2010/0046535 A1* | 2/2010 | Bugenhagen | H04L 65/1046 370/401 |
| 2012/0128144 A1 | 5/2012 | Chislett et al. | |
| 2014/0369489 A1 | 12/2014 | Ermann et al. | |
| 2015/0249737 A1* | 9/2015 | Spievak | H04M 3/436 379/189 |
| 2016/0036991 A1* | 2/2016 | Brewer | H04M 7/1285 370/356 |
| 2017/0163537 A1 | 6/2017 | Peterson et al. | |
| 2017/0163803 A1* | 6/2017 | Russell | H04L 65/1076 |
| 2017/0270569 A1* | 9/2017 | Altberg | H04M 15/08 |
| 2018/0249006 A1* | 8/2018 | Dowlatkhah | H04B 7/0417 |
| 2019/0174000 A1* | 6/2019 | Bharrat | H04M 3/541 |

\* cited by examiner

VOICE CALL CONTROLLER

CROSS REFERENCE TO RELATED APPLICATIONS

This application is a continuation of U.S. patent application Ser. No. 15/883,533, filed Jan. 30, 2018, now U.S. Pat. No. 10,735,474, issued Aug. 4, 2020, which is hereby incorporated by reference in its entirety.

BACKGROUND

This disclosure pertains to digital telephony over packet networks, such as Voice over Internet Protocol (VoIP) calling.

Outbound VoIP telephone calls may be serviced by session border controllers (SBCs) that allocate resources to handle the voice media data and control signaling associated with each voice call. The SBCs may work in conjunction with a least-cost router (LCR) to determine the most economical means for routing calls to their destinations. For example, a service provider may have a choice between using internal pathways and using call capacity offered by another service provider to terminate call, and each option may have unique associated costs.

Unfortunately, not all calls can be connected, and many calls may be undesirable for other reasons. For example, many of the calls coming in to an SBC may be nuisance calls, such as spam or unwanted political advertisements. Further, such calls may be dialed at random by the caller, and may therefore be more prone to being directed to numbers which are not in service.

It may not be possible to screen such calls using the Internet protocol (IP) source address of each call. For example, the same IP address may be used for many different call originators, and therefore the IP address itself be used for both spam and legitimate telephone traffic.

Undesirable calls received at an SBC place an unnecessary capacity burden on the SBC. For example, for a call placed to a number that is out of service, the inability to terminate the call may be discovered only after media and control resources have been allocated to the call. Once allocated, these resources are then unavailable to service legitimate traffic. An SBC may then have to be inefficiently large, therefore, or multiple SBCs may need to be employed to encompass the extra capacity needed to handle the bad calls.

Some call originators exhibit a variety of problematic calling behavior. For example, if a call cannot be completed on a first SBC, a caller may connect attempt the call through a second SBC, despite the fact that the call had no chance of being completed, e.g., because the recipient's phone number is not in server. In this scenario, SBC resources are doubly wasted, since the waste is repeated on each SBC on which the call is attempted.

SUMMARY

Digital telephony, such as calls made using Voice over Internet Protocol (VoIP), may be managed efficiently through the use of voice call controllers (VCCs) configured to poll session border controllers (SBCs), filter calls based on call source and call originator parameters, re-route calls, and/or generate filter and communicate filter rules or statistics.

By placing VCCs upstream of SBCs, between the call originator and the SBCs, the efficiency of the network may be greatly improved, allowing lower investments in capital equipment, higher utilization of equipment for legitimate traffic, and higher performance in responding to requests for routing legitimate traffic. For example, by observing the frequency and success characteristics for call originators and intended call recipients, VCCs can develop and implement rules to block suspicious call behavior. Importantly, when placed upstream from SBCs to vet outbound calls before they arrive at the SBCs, VCCs may prevent the SBCs from ever allocating resources to suspicious calls. The SBCs may then need to process only those calls which have a high probability of being completed, for example, or have a high probability of being desired by the recipient.

A VCC may poll a plurality of session border controllers (SBCs) to determine a call carrying capacity of each polled SBC. Upon receiving a request to route a call from a call source, the VCC may select an SBC to which the call is initially routed. The VCC may use Simple Network Management Protocol (SNMP) messaging to communicate with individual SBCs or pools of SBCs.

A VCC may filter call requests based on the identity of the call originator. For example, beyond filtration of packets by Internet protocol (IP) address, the VCC may additionally or alternatively perform packet inspection to determine the telephone number of the call originator, e.g., from a Session Initiation Protocol (SIP) header in the packet. The VCC may maintain a set of rules, e.g., including black lists and white lists, of call originators to whom service should be provided or declined.

A VCC or other network entity may develop a set of rules for filtering call originators, e.g., based on observations of call behaviors over time. For example, an entity creating filter rules may weigh such factors as: the number of call attempts by the call originator in a period of time; the ratio of call attempts to completed calls by the call originator in a period of time; an average length of completed calls by the call originator in a period of time; and the ratio of calls attempted by the call originator to numbers in service to numbers not in service. For example, a call originator may be blocked if making more than 1000 call attempts in a day, less than 5% of attempted calls are completed, the average length of a completed call is less than 6 seconds per call, or more than 30% of calls attempted are made to numbers not in service.

In the case that a call routed by a VCC to a selected SBC fails, the VCC may route the call to an alternative SBC. For example, if an error is returned by an SBC or router, or the connection is not completed within a specified time, the VCC may switch to use of the alternative SBC. The VCC may do so without informing the call originator, or the call source, that routing via the originally selected SBC failed.

A VCC may filter call requests based on call source rate limits. For example, the VCC may maintain separate statistics on requests for call routing that are received from a particular carrier or VoIP service provider. Source rate limits may include, for example, limits on the number of calls requested by the call source within a period of time, e.g., calls per second, or on the number of calls active at a given time.

For example, a VCC may collect statistics on calls requested by a call source or a call originator, and share such statistics with other VCCs or other network entities. Similarly, the VCC may share rules that it has created with other VCCs or other network entities, such as call originator blacklists based on calling statistics, or call source statistics shared for the purposes of enforcing a call source rate policy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Digital telephony may be managed efficiently through the use of voice call controllers (VCCs) configured to poll session border controllers (SBCs), filter calls based on call source and call originator parameters, re-route calls, and/or generate filter and communicate filter rules or statistics.

Digital telephony presents certain challenges which are not well addressed by traditional IP protocol load balancers. For example, traditional load balancers may provide for filtering traffic on a packet basis by examination of the IP address of the sender. However, IP address may or may not be a useful indication of the validity of a VoIP call. Legitimate calls and fraudulent, spoof, and spam calls may use the same IP address. Therefore, to avoid spending device and network resources on calls which are either undesired or unprofitable, it is better to focus on traits of calls such as the identity and behavior of the call originator. This requires a deeper inspection of the call packets than is afforded by merely checking the IP address of the sender.

At the same time, it may be preferred that packets are not managed individually. Rather, all packets for a given call should be routed to a single set of assigned resources, e.g., to avoid issues of call dropping and premature termination.

These needs may be addressed by placing VCCs at the edge of a telephony network, such that calls may be filtered and routed according to the particular requirements of digital voice calling. While, for example, a lowest cost routing system may be well positioned to analyze call performance in an effort to stem the flow of fraudulent or poor performing traffic, such a determination can only be made by a router after a call has infiltrated to consume network and device resources, e.g., SBC and router capacity, as well as carrier fiber optic fabric bandwidth.

A VCC may poll a plurality of SBCs to determine a call carrying capacity of each polled session border controller (SBC). The VCC may use simple Network Management Protocol (SNMP) messaging to communicate with individual SBCs or pools of SBCs. By efficiently communicating directly with SBC resources, the VCCs may operate independent of each other. For example, it is not necessary for a VCC to maintain a record of the state of other VCCs. Further, the true state of the SBCs can be known via polling, e.g., without reliance on a record maintained by the VCC of traffic sent to the SBC. For example, a VCC receiving a response to a poll will know the actual conditions at the SBCs, regardless of the cause of congestion, e.g., failures or traffic coming from unmonitored sources.

Upon receiving a request to route a call from a call source, the VCC may select an SBC to which the call should be initially routed. For example, a VCC may prefer to spread calls evenly among a number of SBCs, rather than filling up a single SBC before turning to others for capacity. Similarly, a VCC may find it advantageous to observe trends of SBC filling in order to avoid getting caught in a race to acquire resources as entity usage nears capacity.

A VCC may filter call requests based on the identity of the call originator. For example, beyond filtration of packets by Internet protocol (IP) address, the VCC may additionally or alternatively perform packet inspection to determine the telephone number of the call originator, e.g., from a Session Initiation Protocol (SIP) header in the packet. The VCC may maintain a set of rules, e.g., including black lists and white lists, of call originators to whom service should be provided or declined.

A VCC or other network entity may develop a set of rules for filtering call originators, e.g., based on observations of call behaviors over time. For example, an entity creating filter rules may weigh such factors as: the number of call attempts by the call originator in a period of time; the ratio of call attempts to completed calls by the call originator in a period of time; an average length of completed calls by the call originator in a period of time; and the ratio of calls attempted by the call originator to numbers in service to numbers not in service. For example, a call originator may be blocked if making more than 1000 call attempts in a day, less than 5% of calls completed, the average length of a completed call is less than 6 seconds per call, or more than 30% of calls attempted to numbers not in service. A number of SIP 4XX responses above a nominal level may indicate that the call originator is dialing randomly, for instance, and therefore call requests from the originator should be blocked.

Additionally or alternatively, a VCC may receive call originator filtering rules from another network entity. For example, a number of VCC may provide information about calls from specific call originators to a network function which consolidates and analyzes such information. This may be done dynamically or by batch processing. For example, a VCC or an analyzing network function may monitor call originator activity in real time or near real time, or alternatively process such information overnight. Similarly, VCCs may work cooperatively, by both sharing their data with peer entities and also coming to their own separate conclusions about which call originators to decline in certain circumstances.

In the case that a call routed by a VCC to a selected SBC fails, the VCC may route the call to an alternative SBC. For example, if an error is returned, or the connection is not completed within a specified period, the VCC may switch to use of the alternative SBC. The VCC may do so without informing the call originator or the call source that routing via the selected SBC failed. This allows the system to respond quickly to re-route what appears to be a legitimate call, rather than waiting for the call source or call originator to respond to an error message.

A VCC may filter call requests based on call source rate limits. For example, the VCC may maintain separate statistics on requests for call routing requests received from a particular carrier or VoIP services provider. Source rate limits may include, for example, limits on the number of calls requested by the call source within a period of time, (e.g., calls per second) or on the number of calls active at a given time. This may be done, for example, to avoid network congestion issues, or to enforce level-of-service contractual requirements.

For example, a VCC may collect statistics on calls requested by a call source or a call originator, and share such statistics with other VCCs or other network entities. Similarly, the VCC may share rules that it has created with other VCCs or other network entities, such as call originator blacklists based on calling statistics, or call source statistics shared for the purposes of enforcing a call source rate policy.

Other rules may be applied. For example, white lists may be maintained by a VCC for call sources and call originators which should be served regardless of violation of any other rule. Similarly, certain classes of calls, such as emergency calls may be white listed across all call sources and call originators.

Figure 1:
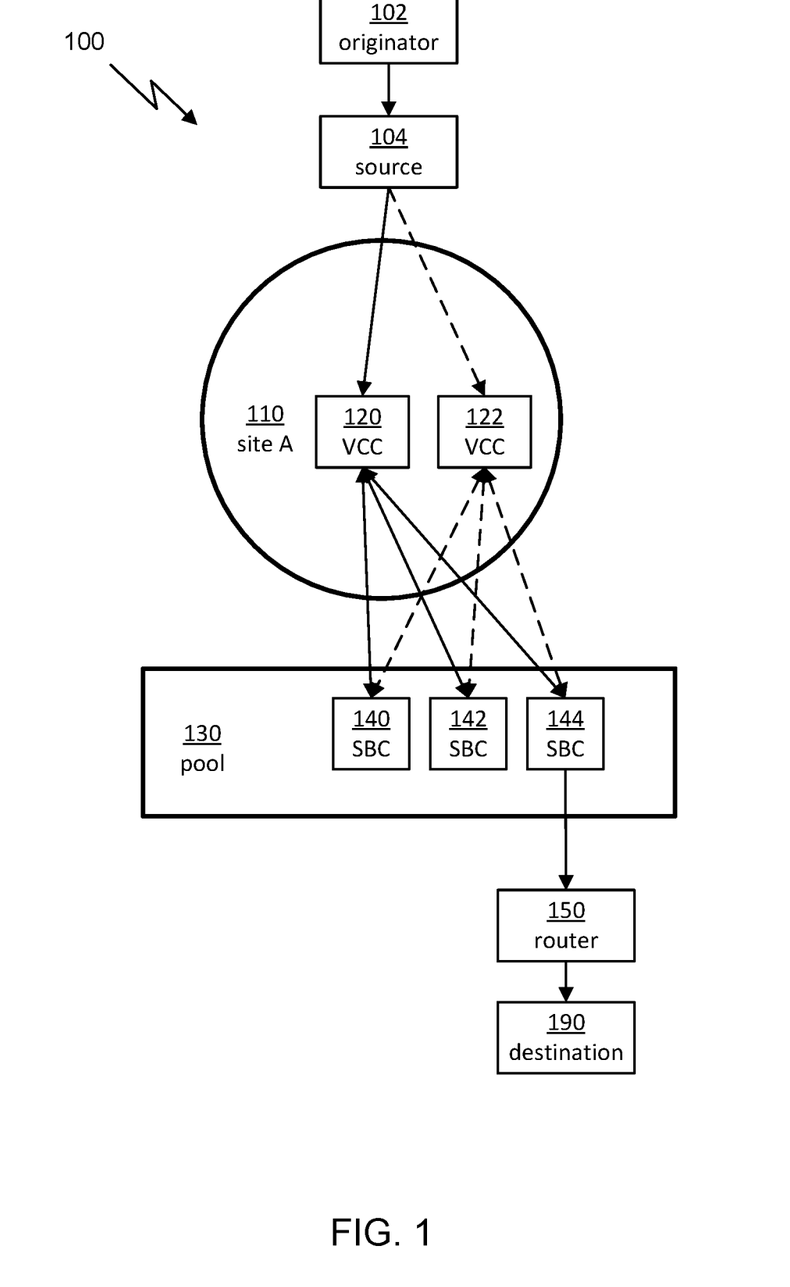
FIG. 1 is a block diagram of an example system using voice call controllers (VCCs).

FIG. 1 is a block diagram of an example digital telephony system 100 that uses voice call controllers (VCCs). A call originator 102 may send requests for VoIP call connections to his service provider, call source 104. Call source 104 is able to send requests for call connections to VCCs 120 and 122 at site A 110. VCCs 120 and 122 are in communication with session border controllers (SBCs) 140, 142, and 144 in an SBC pool 130. The VCCs 120 and 122 each independently query each of the SBCs 140, 142, and 144 to find out the current status of call handling capacity at each SBC, e.g., using SNMP or another messaging protocol. When a call request is received from the originator 102 at VCC 120 at site A 110, for example, the VCC 120 may select an SBC for use in servicing the call based on any number factors, such as the available capacity of the SBC, the overall load on all SBCs, and the balancing of loading among the SBCs. In the example of FIG. 1, SBC 144 is selected. SBC 144 routes the call to a router 150. Router 150 may be, for example, a least cost routing system which selects the most economical way to reach the indicated call destination 190.

Figure 2:
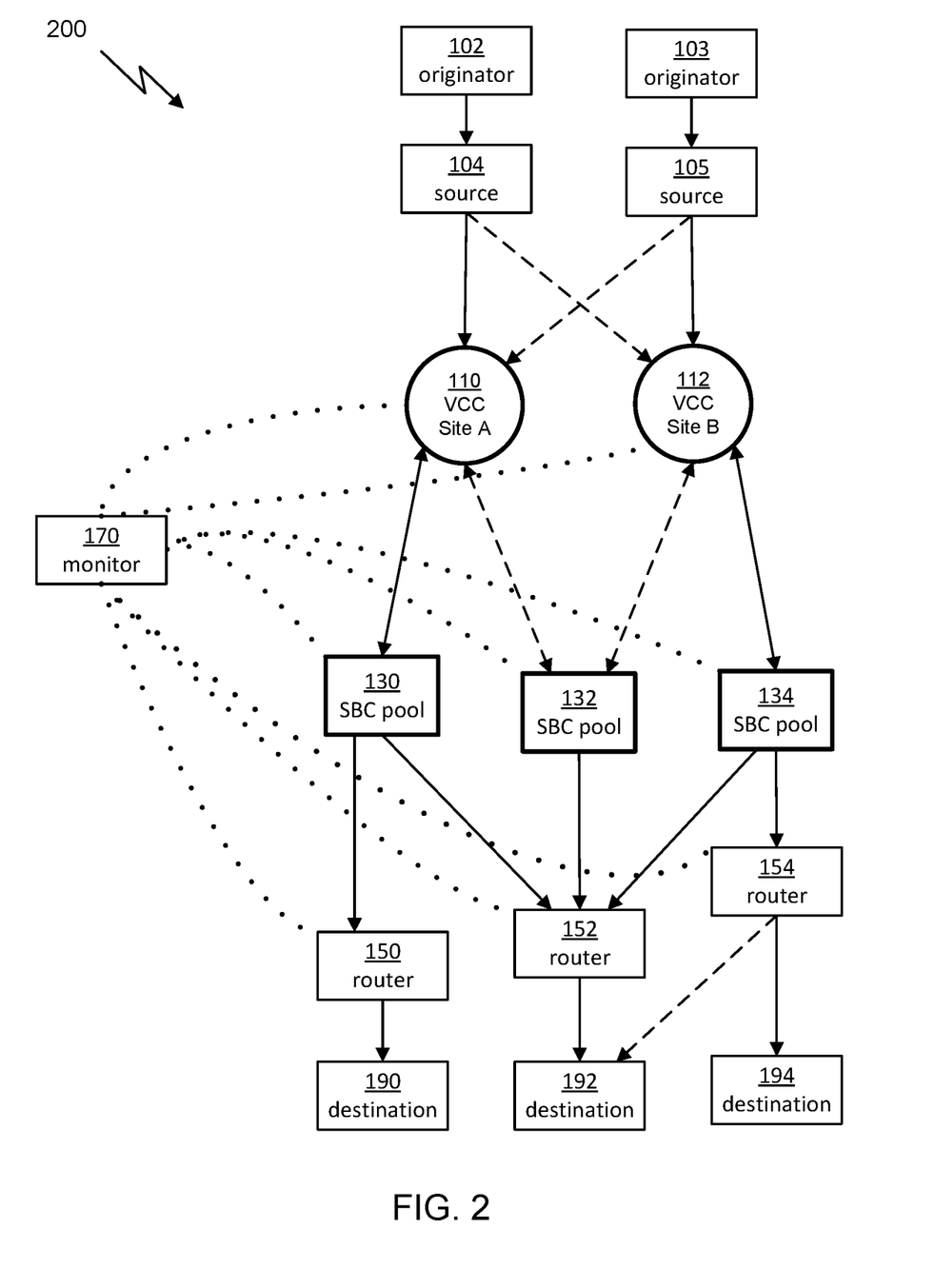
FIG. 2 is a block diagram of another example system using VCCs.

FIG. 2 is a block diagram of another example digital telephony system 200 that uses voice call controllers (VCCs). The system 200 includes all of the entities of the system 100, including the VCCs at site A 100 and SBCs in the SBC pool 130, although the individual VCCs and SBCs are not shown in FIG. 2. The system 200 includes an additional call originator 103 using a service provider or carrier call source 105. In addition to reaching VCCs at site A 110, call source 104 is also able to connect to VCCs at a second VCC site B 112, e.g., where site A 110 is the primary site used by source 104, and site B 112 is a backup or alternative site for source 105. Source 105 similarly may use the VCCs at site B 112 as its primary resources, but also be able to contact the VCCs at site A as a backup or alternative. For example, source 105 may be given addresses to use for VCCs at site A 110 which are different from the addresses used by source 104, but reach the same physical VCCs.

The system 200 includes multiple SBC pools 130, 132, and 134. For example, VCC site A 110 may primarily use SBC pool 130, but also be able to access other pools such as SBC pool 132 as an alternative or backup resource. Similarly, VCC site B can easily reach both SBC pool 132 and 134. Further down the network from the SBC pools 130, 132, and 134 are the network routing and fabric sections denoted as routers 150, 152, and 154. SBCs may select a router to use, or leave routing decisions to an associated router, for example. Different routing configurations may have different associated costs, e.g., in terms of device, bandwidth, or third party fees, for example, which may lead to routing to destination 192 being preferred via router 152, but also possible at higher cost via router 154.

Also shown in FIG. 2, the system 200 includes a monitor function 170 which collects data about calls. The monitor 170 may circulate collected information to various components, e.g., the VCCs, SBCs, and routers, and may additionally or alternatively aggregate the data and develop rules as to which call requests to honor and which call requests to decline, e.g., based on call behavior. Additionally or alternatively, VCCs may periodically exchange data among themselves as to which call originators tend to have certain call behaviors. Similarly, SBCs and routers may exchange such information among themselves or with other types of entities such as VCCs. In the end, it is advantageous to have call rules located and acted upon in the VCCs in order to decline calls from poor performing call originators. For example, by locating call declining decisions at the edge of the network facing the call sources, the system 200 can most effectively decline calls from call originators who are known to be practicing high volume calling or placing calls with low success rates, high error rates, or low connections times. Rules may be generated anywhere in the system, using data collected from anywhere in the system.

Similarly, the monitor 170 may be used to observe call behaviors per call source, e.g., toward developing or enforcing rules regarding the number of calls initiated in a period of time or the simultaneous number of calls from the call source at a particular time. Such information and rules may be propagated to other system entities, such as VCCs, SBCs, and routers. Additionally or alternatively, VCCs, SBCs, and routers may share and data and rules among themselves or each other. Ultimately, it is advantageous to have both call originator and call source rules located and enforced by the VCCs.

Figure 3:
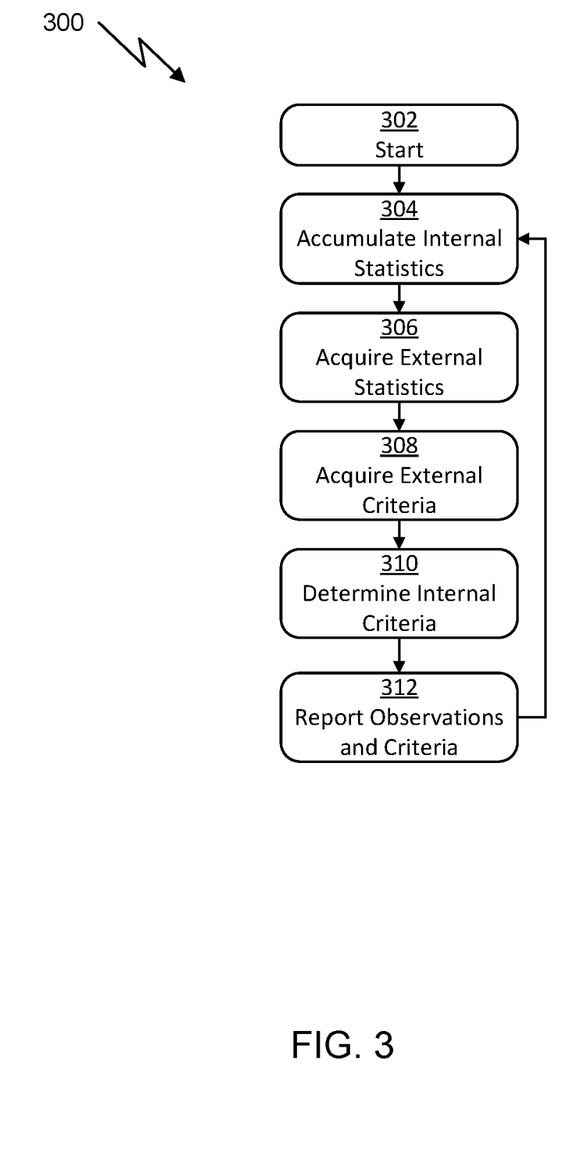
FIG. 3 is a flow chart of an example method for developing rules for filtering call requests.

FIG. 3 is a flow chart of an example method 300 of developing rules for declining call requests. The method 300 may be used by any system entity, e.g., a VCC, SBC, router, or monitor function. The method 300 starts at step 302. In step 304, the entity optionally accumulates internal statistics about calls the entity has processed. For example, the entity may aggregate information about calls from a call originator, IP address, or a call source, such as the number of calls, call duration and connection rates, and call error rates. In the step 306 the device optionally acquires call information from one or more other entities.

In step 308, the entity optionally acquires rule criteria from one or more external entities. For example, the entity may acquire rules, such as: blacklists of call originators whose call requests should be declined; whitelists of call originators whose call requests should not be declined, even if call behaviors otherwise suggest that the originator's requests should be declined; limits for the number of calls from a call source in a period of time, e.g., per second; limits for the total number of calls from a call to be supported at a time; white lists of call sources from whom call requests should not be declined, even when nominal limits are exceed. Similarly, the types of rules used for call sources may be used for call originators, and vice versa. For example, limits may be maintained for the number of calls an originator may make per hour.

In step 310, the entity optionally determines rules to follow in processing call requests. Rules may be adopted that were provided by an external entity in step 308, for example. Additionally or alternatively, rules may be developed by applying criteria received from an external entity in step 308 to internal data acquired in step 304 or external data acquired in 306, or a combination of such data. For example, in step 310, the entity may determine to blacklist a call originator for: placing more than 100, 500, or 1,000 calls a day, or 20, 50, or 100 calls in an hour; for making calls which, when completed, last on average less than 3, 6, or 10 seconds; for placing calls which go unanswered 80%, 90%, or 95% of the time; or for placing calls 10, 20, or 30% of the time to numbers that are not in service or otherwise invalid. Similarly, the entity may formulate analogous rules for call sources.

In step 312, the entity optionally reports data, rules, or rule criteria to one or more other entities in the system. For example, the entity may report its internally acquired data, externally acquired data, or an aggregation of internal and external data. The entity may pass along rule criteria which it has acquired from an external entity, or additionally or alternatively pass along rules that the entity has derived by applying such criteria to data available to the entity.

Figure 4:
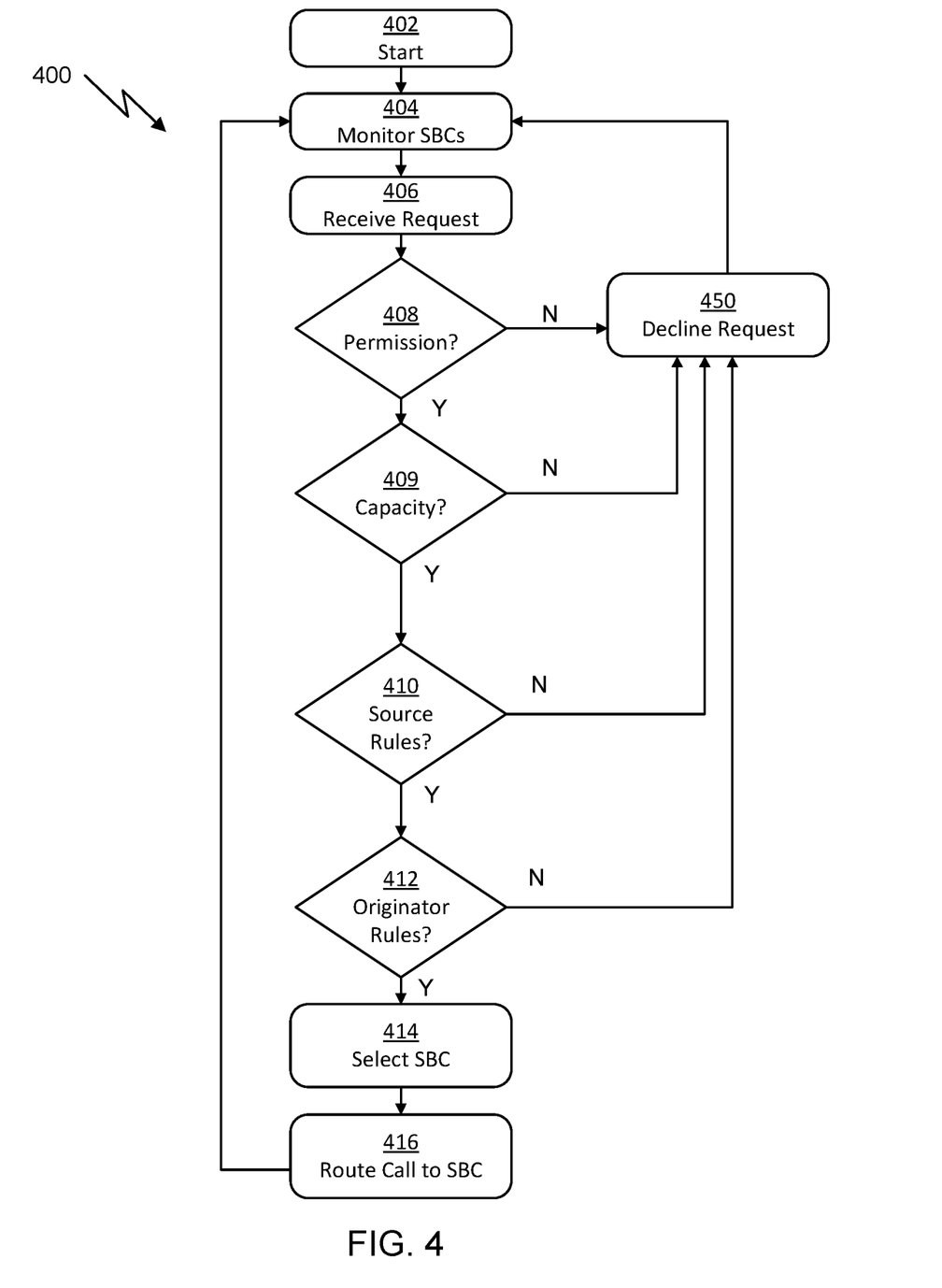
FIG. 4 is a flow chart of an example method for processing call requests using a VCC.

FIG. 4 is a flow chart of an example method 400 that may be employed by a VCC to manage call requests. The method 400 starts at step 402. In step 404, the VCC monitors the status of associated SBCs. For efficiency, the VCC may poll the SBCs only periodically, rather than each time step 404 is reached. If the VCC has recently polled the SBCs, the VCC may skip to the next step without polling the SBCs.

Monitoring the SBCs in step 404 may involve a number of different operations. For example, the VCC may poll individual SBCs using SNMP or another protocol to find out the available call carrying capacity of each SBC. Additionally or alternatively, a VCC may receive network loading information from external entity, such as other VCCs, a call monitor such the monitor 170 described in reference to FIG. 2, or other network congestion monitoring or load balancing entities. Exchanging small packets directly with the SBCs, however, is an efficient way of getting an accurate picture of current conditions.

In step 406 of FIG. 4, the VCC receives a request to connect a call. The request arrives from a call source and bears indicia of the call originator, e.g., as an originator telephone number in a SIP header.

In step 408, the VCC checks general permissions for servicing the call, e.g., whether the call source is generally permitted to request connections through the VCC. For example, the operator of the VCC may have contracts to service calls only from certain call sources, such as specific Internet service providers (ISPs) or telephone carriers or system operators. If the call is generally permitted by policy, then the VCC proceeds to step 410. Otherwise, the request to connect the call is declined in step 450, and the method proceeds back to step 404 to check whether it is time to once again poll the SBCs.

In step 409, the VCC checks whether the VCC is aware of resources being available to connect the call. For example, if based on polling the VCC knows that the system has no available for additional non-emergency phone calls, the VCC may decline the call. Similarly, if the nature of call requires resources in excess of network capability, the VCC may decline the call. For example, the requested call may be a video conference call with latency or resolution requirements which are beyond the current capacity of the system or inherent capacity of the particular network employed.

In step 410, the VCC checks whether routing the call would be consistent with rules governing connecting calls for the particular call source. For example, the VCC may check whether connecting the call would violate a policy against connecting a certain number of calls simultaneously or a certain number of calls within a period of time. The VCC may further check whether the particular call source is white listed. For example, the VCC may check whether the caller is permitted to place the call via the VCC even though call flow limits have been exceeded. If the request is not congruent with the call source rules, the VCC may decline to connect the call.

In step 412, where the call request has passed the screenings for permission, capacity, source rules, and originator rules, the VCC selects an SBC for use in the routing the call. The selection may be based, for example, on the greatest current available capacity or other criteria, such as special bandwidth capacity, e.g., for multi-media calls, or access to certain portions of the overall network for the sake of ease in ultimately routing the call to the destination.

In step 414, the VCC routes to the call to a particular selected SBC. The VCC then proceeds back to step 404 to check whether it is time to refresh SBC capacity information.

It will be appreciated that certain steps in methods described herein, such as particular steps in methods 300 and 400, may be omitted in circumstances or performed in a different order. For example, regarding method 400, one or more of steps 408, 409, 410, and 412 may be omitted in circumstances where they are not required. Similarly, these steps may be performed in any order. Similarly, step 414 may be performed immediately after step 404, even before a request to connect a call is received.

The invention claimed is:

1. A method, comprising:
receiving, by a voice call controller and from a call originator, a call, wherein the call originator and the voice call controller are located outside of a telephony network;
determining, based on information indicative of prior call activity associated with the call originator, an average length of completed calls initiated by the call originator;
receiving, by the voice call controller, capacity information for a plurality of session border controllers;
determining, based on the average length of completed calls and the capacity information, whether to forward the call to the telephony network; and
forwarding, based on the determined average length of completed calls initiated by the call originator and the capacity information, the call to a session border controller of the plurality of session border controllers of the telephony network.

2. The method recited in claim 1, wherein the forwarding the call to the session border controller of the telephony network is further based on one or more rules.

3. The method recited in claim 1, further comprising:
determining a call source volume indicative of a quantity of calls by the call originator in a period of time; and
based on the call source volume satisfying a threshold, blocking the call.

4. The method recited in claim 1, wherein the call comprises a Voice over Internet Protocol call.

5. The method recited in claim 1, further comprising:
storing, in a database, information indicative of call activity associated with a plurality of call originators; and
retrieving, from the database, the information indicative of prior call activity associated with the call originator.

6. The method recited in claim 5, further comprising adjusting, based on receiving the call, an entry in the database.

7. A system, comprising:
a telephony network comprising a plurality of session border controllers, wherein the session border controllers are located at an edge of the telephony network; and
a voice call controller located outside of the telephony network and configured to:
receive, from a call originator, a call, wherein the call originator is located outside of the telephony network;
determine, based on information indicative of prior call activity associated with the call originator, an average length of completed calls initiated by the call originator;
receive capacity information for a plurality of session border controllers;
determine, based on the average length of completed calls and the capacity information, whether to forward the call to the telephony network; and
forward, based on the determined average length of completed calls initiated by the call originator and the capacity information, the call to a session border controller of the plurality of session border controllers.

8. The system of claim 7, wherein forwarding the call to the session border controller is further based on one or more rules.

9. The system of claim 7, wherein the voice call controller is further configured to:
determine a call source volume indicative of a quantity of calls by the call originator in a period of time; and
based on the call source volume satisfying a threshold, block the call.

10. The system of claim 7, wherein the call comprises a Voice over Internet Protocol call.

11. The system of claim 7, wherein the system further comprises a database storing information indicative of call activity associated with a plurality of call originators and the voice call controller is further configured to retrieve, from the database, the information indicative of prior call activity associated with the call originator.

12. The system of claim 11, wherein an entry in the database is adjusted based on receiving the call.

13. A method, comprising:
receiving, by a voice call controller and from a call originator, a call, wherein the call originator and the voice call controller are located outside of a telephony network;
determining, based on information indicative of prior call activity associated with the call originator, a ratio of call attempts to completed calls by the call originator;
receiving, by the voice call controller, capacity information for a plurality of session border controllers;
determining, based on the determined ratio of call attempts to completed calls by the call originator and the capacity information, whether to forward the call to the telephony network; and
forwarding, based on the determined ratio of call attempts to completed calls by the call originator and the capacity information, the call to a session border controller of the plurality of session border controllers of the telephony network.

14. The method recited in claim 13, wherein the forwarding the call to the session border controller of the telephony network is further based on one or more rules.

15. The method recited in claim 13, further comprising:
determining a call source volume indicative of a quantity of calls by the call originator in a period of time; and
based on the call source volume satisfying a threshold, blocking the call.

16. The method recited in claim 13, wherein the call comprises a Voice over Internet Protocol call.

17. The method recited in claim 13, further comprising:
storing, in a database, information indicative of call activity associated with a plurality of call originators; and
retrieving, from the database, the information indicative of prior call activity associated with the call originator.

18. The method recited in claim 17, further comprising adjusting, based on receiving the call, an entry in the database.

19. A system, comprising:
a telephony network comprising a plurality of session border controllers, wherein the session border controllers are located at an edge of the telephony network; and
a voice call controller located outside of the telephony network and configured to:
receive, from a call originator, a call, wherein the call originator is located outside of the telephony network;
determine, based on information indicative of prior call activity associated with the call originator, a ratio of call attempts to completed calls by the call originator;
receive capacity information for the plurality of session border controllers;
determine, based on the determined ratio of call attempts to completed calls by the call originator and the capacity information, whether to forward the call to the telephony network; and
forward, based on the determined ratio of call attempts to completed calls by the call originator and the capacity information, the call to a session border controller of the plurality of session border controllers.

20. The system of claim 19, wherein forwarding the call to the session border controller is further based on one or more rules.

21. The system of claim 19, wherein the voice call controller is further configured to:
determine a call source volume indicative of a quantity of calls by the call originator in a period of time; and
based on the call source volume satisfying a threshold, block the call.

22. The system of claim 19, wherein the call comprises a Voice over Internet Protocol call.

23. The system of claim 19, wherein the system further comprises a database storing information indicative of call activity associated with a plurality of call originators and the voice call controller is further configured to retrieve, from the database, the information indicative of prior call activity associated with the call originator.

24. The system of claim 23, wherein an entry in the database is adjusted based on receiving the call.

* * * * *